United States Patent
Li et al.

(10) Patent No.: US 11,323,177 B2
(45) Date of Patent: May 3, 2022

(54) METHOD AND SYSTEM FOR FREE SPACE OPTICAL COMMUNICATION PERFORMANCE PREDICTION

(71) Applicant: INTELLIGENT FUSION TECHNOLOGY, INC., Germantown, MD (US)

(72) Inventors: Lun Li, Germantown, MD (US); Yi Li, Germantown, MD (US); Sixiao Wei, Germantown, MD (US); Dan Shen, Germantown, MD (US); Genshe Chen, Germantown, MD (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 39 days.

(21) Appl. No.: 17/021,289

(22) Filed: Sep. 15, 2020

(65) Prior Publication Data

US 2022/0085878 A1    Mar. 17, 2022

(51) Int. Cl.
*H04B 10/077* (2013.01)
*H04B 10/11* (2013.01)
(Continued)

(52) U.S. Cl.
CPC ....... *H04B 10/0775* (2013.01); *G06K 9/6261* (2013.01); *G06K 9/6262* (2013.01);
(Continued)

(58) Field of Classification Search
CPC .. H04B 10/0775; H04B 10/11; G06N 3/0481; G06N 3/08; G06K 9/6261; G06K 9/6262
(Continued)

(56) References Cited

U.S. PATENT DOCUMENTS

| | | | |
|---|---|---|---|
| 2018/0262291 A1* | 9/2018 | Doster | H04B 13/02 |
| 2020/0097742 A1* | 3/2020 | Ratnesh Kumar | G06N 3/0481 |
| 2020/0220617 A1* | 7/2020 | Innes | H04B 10/11 |

OTHER PUBLICATIONS

Li, "Machine Learning Based Tool Chain Solution for Free Space Optical Communication (FSOC) Propagation Modeling", 2021 IEEE Aerospace Conference (50100) Year: 2021 | Conference Paper | Publisher: IEEE. (Year: 2021).*

(Continued)

*Primary Examiner* — Juan A Torres
(74) *Attorney, Agent, or Firm* — Anova Law Group, PLLC

(57) ABSTRACT

Various embodiments provide a method for free space optical communication performance prediction method. The method includes: in a training stage, collecting a large number of data representing FSOC performance from external data sources and through simulation in five feature categories; dividing the collected data into training datasets and testing datasets to train a prediction model based on a deep neural network (DNN); evaluating a prediction error by a loss function and adjusting weights and biases of hidden layers of the DNN to minimize the prediction error; repeating training the prediction model until the prediction error is smaller than or equal to a pre-set threshold; in an application stage, receiving parameters entered by a user for an application scenario; retrieving and preparing real-time data from the external data sources for the application scenario; and generating near real-time FSOC performance prediction results based on the trained prediction model.

19 Claims, 11 Drawing Sheets

(51) Int. Cl.
   *G06N 3/04*      (2006.01)
   *G06K 9/62*      (2022.01)
   *G06N 3/08*      (2006.01)
(52) U.S. Cl.
   CPC ............. *G06N 3/0481* (2013.01); *G06N 3/08* (2013.01); *H04B 10/11* (2013.01)
(58) Field of Classification Search
   USPC ........................................................ 398/118
   See application file for complete search history.

(56) References Cited

OTHER PUBLICATIONS

Yang, "Hierarchical Attention Networks for Document Classification," Proceedings of the 2016 Conference of the North American Chapter of the Association for Computational Linguistics: Human Language Technologies. Jun. 12, 2016 pp. 1480-1489. (Year: 2016).*

* cited by examiner

METHOD AND SYSTEM FOR FREE SPACE OPTICAL COMMUNICATION PERFORMANCE PREDICTION

GOVERNMENT RIGHTS

The present disclosure was made with Government support under Contract No. FA8750-19-C-0029, awarded by the United States Air Force Research Laboratory. The U.S. Government has certain rights in the present disclosure.

FIELD OF THE DISCLOSURE

The present disclosure generally relates to the field of free space optical communication and, more particularly, relates to a method and a toolchain system for free space optical communication performance prediction.

BACKGROUND

Free space optical communication (FSOC) provides substantially higher data rate than radio frequency (RF) communication. As the demand for large data rates increases, FSOC becomes a desired form of communication between airplanes, between airplanes and ground stations, between ground stations, or between spacecrafts. Unlike RF communication, FSOC operates in optical bands that are not regulated. Thus, FSOC shows an enormous advantage in terms of bandwidth.

A basic FSOC system includes a transmitter to transmit laser signals and a receiver to receive the laser signals transmitted from the transmitter. In a bi-directional or two-way FSOC system, a terminal includes both the transmitter and the receiver and simultaneously transmits and receives the laser signals. The laser signals may be attenuated and distorted by air and other environmental factors while propagating through the free space between the transmitter and the receiver of different terminals. Accurate simulation of the transmission performance (e.g., propagation, coverage) between the transmitter and the receiver helps secure desired FSOC performance while planning a flight path. When the accurate simulation is achieved in near real-time, FSOC performance prediction may be used to guide the flight of the airplanes.

However, FSOC poses several technical challenges. For example, laser signal fading tends to occur due to atmospheric turbulence, which causes fluctuations in both intensity and phase of received signals. Additionally, small particles such as water droplets along with the propagation channel of FSOC may impose spatial, angular and temporal dispersion on the transmitted laser signals. Particles may also absorb some of the energy. Attenuation of the transmitted laser signals through the propagation medium may be a combined effect of dispersion and absorption by particles. Temporal dispersion causes pulse spread that limits data rates.

Therefore, it is essential to develop a method and system for free space optical communication performance prediction that can accurately predict the free space communication performance for planning the flight path of airplanes or spacecrafts and guiding airborne airplanes to avoid flying into any air space that causes severe degradation of FSOC performance.

BRIEF SUMMARY OF THE DISCLOSURE

One aspect or embodiment of the present disclosure includes a free space optical communication (FSOC) performance prediction method. The method includes: in a training stage, collecting a large number of data representing FSOC performance from external data sources and through simulation in five feature categories; dividing the collected data into training datasets and testing datasets to train a prediction model based on a deep neural network (DNN); evaluating a prediction error by a loss function and adjusting weights and biases of hidden layers of the DNN to minimize the prediction error; repeating training the prediction model until the prediction error is smaller than or equal to a pre-set threshold; in an application stage, receiving parameters entered by a user for an application scenario; retrieving and preparing real-time data from the external data sources for the application scenario; and generating near real-time FSOC propagation prediction results based on the trained prediction model.

Another aspect or embodiment of the present disclosure includes a toolchain system for FSOC performance prediction. The toolchain system includes: a memory storing computer program instructions; and a processor coupled to the memory and, when executing the computer program instructions, configured to perform: in a training stage, collecting a large number of data representing FSOC performance from external data sources and through simulation in five feature categories; dividing the collected data into training datasets and testing datasets to train a prediction model based on a deep neural network (DNN); evaluating a prediction error by a loss function and adjusting weights and biases of hidden layers of the DNN to minimize the prediction error; repeating training the prediction model until the prediction error is smaller than or equal to a pre-set threshold; in an application stage, receiving parameters entered by a user for an application scenario; retrieving and preparing real-time data from the external data sources for the application scenario; and generating near real-time FSOC performance prediction results based on the trained prediction model.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the disclosure may be practiced.

These embodiments are described in sufficient detail to enable those skilled in the art to practice the disclosure and it is to be understood that other embodiments may be utilized and that changes may be made without departing from the scope of the disclosure. The following description is, therefore, merely exemplary.

Figure 1:
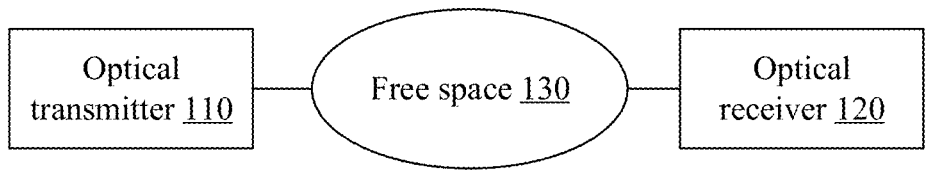
FIG. 1 depicts a block diagram illustrating an exemplary free space communication system according to various disclosed embodiments of the present disclosure.

Various embodiments provide a method for free space optical communication (FSOC) performance prediction. FIG. 1 depicts a block diagram illustrating an exemplary free space communication system according to various disclosed embodiments of the present disclosure. As shown in FIG. 1, the free space optical communication system 100 includes an optical transmitter 110, an optical receiver 120, and a free space 130 between the optical transmitter 110 and the optical receiver 120. The free space 130 may be air, outer space, vacuum, or something similar. The optical transmitter 110 may include a laser. Intensity of a laser signal is modulated to carry data and is sent from the optical transmitter 110 to the optical receiver 120 after propagating through the free space 130.

For example, the optical transmitter 110 and the optical receiver 120 may be mounted on airborne airplanes or unmanned aerial vehicles (UAV) to facilitate FSOC between two airplanes, two UAVs, or one airplane and one UAV. The airplane or the UAV may include both the optical transmitter 110 and the optical receiver 120 to allow bi-directional or two-way communication. In another example, one of the optical transmitter 110 and the optical receiver 120 may be mounted on an airborne airplane or UAV and the other may be mounted on a ground station to allow FSOC between the airborne or UAV and the ground station.

When the airborne relies on FSOC for data communication, the flight path of the airplane may be planned in advance to ensure reliable FSOC performance. The laser signal sent from the optical transmitter 110 to the optical receiver 120 may be attenuated and/or distorted by the dynamically changing free space 130 in between. Accurate modeling of optical signal propagation through the free space 130 is required to predict the FSOC performance along the flight path of the airborne.

Current methods for representation of optical signal propagation mainly focus on straightforward statistical models, where the parameterization has to be carried out from experimental data. The existing empirical models are typically obtained by using data collected by optical sensors. These optical sensors detect photons of light, which are capable of recording intensities of a laser beam at a certain rate. However, simple, common distributions, in some instances, cannot fully describe the dynamics of the received optical signals, especially in the environments that involve various weather conditions. They lack the generality and rigor of a basic physical-level formulation, i.e., a model specific for one application or scenario cannot be applied to any other case.

To overcome the shortcomings of the statistical models, physical/deterministic modeling is regarded as a promising approach to simulate and represent FSOC propagation effects properly and efficiently, at the physical level with actual environments. Normally, a physics-based model requires detailed inputs describing the optical signal propagation scenario: terrain, building, atmosphere, vegetation, and the usage of theoretical models. However, a physical model is not capable of taking advantage of a large variety of available relevant data. Additionally, the deterministic feature of a physics-based model is not adaptive to various environmental conditions.

Figure 2:
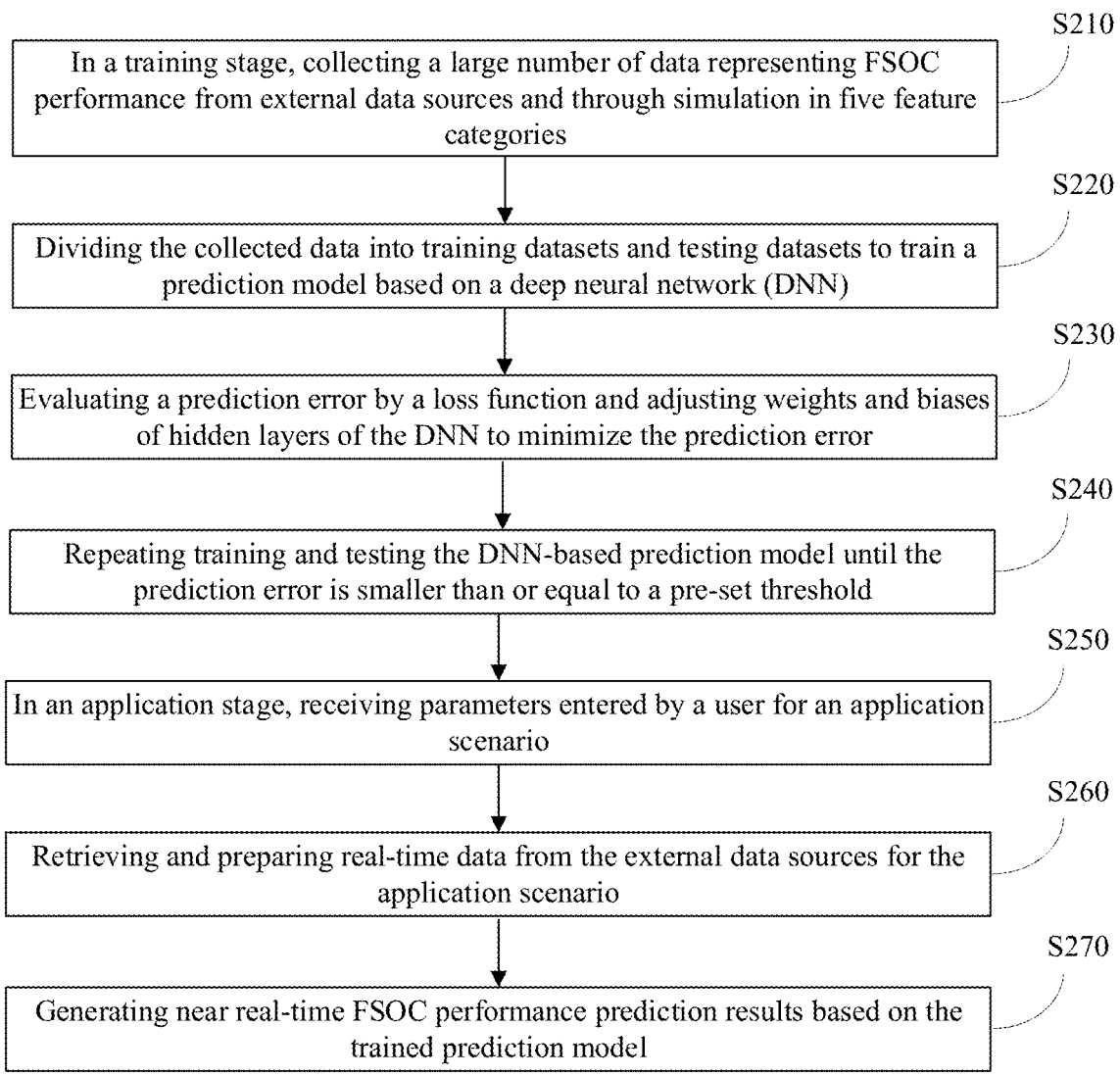
FIG. 2 depicts a flow chart illustrating an exemplary method for free space optical communication performance prediction according to various disclosed embodiments of the present disclosure.

In response to the aforementioned challenges, a machine learning (ML) based FSOC performance prediction method is provided to achieve high modeling accuracy, time efficiency, and significant performance improvement for various environments. FIG. 2 depicts a flow chart illustrating an exemplary method for free space optical communication performance prediction according to various disclosed embodiments of the present disclosure. The method includes a training stage and an application stage. In the training stage, at S210, a large number of data representing FSOC transmission are collected from external data sources and through simulation in five feature categories. The five categories are derived from the analysis of physical/deterministic modeling and may include propagation range, rain rate, visibility, cloud height, and cloud thickness. The external data sources may include terrain data from Cesium and weather data from OpenWeather. The FSOC performance data may include terrain data (e.g., topographic and geological conditions), atmospheric data (e.g. optical measurements on modules in atmosphere), performance information (e.g., signal power), and probing information (e.g., laser signals with/without interface). The FSOC performance data can be obtained through simulation by using a computer program designed to model atmospheric propagation of optical signals based on the terrain data and the weather data retrieved from the external data sources. For example, the computer program may be MODerate resolution atmospheric TRANsmission (MODTRAN).

At S220, the collected data are divided into training datasets and testing datasets to train a prediction model based on a deep neural network (DNN). Specifically, the prediction model is derived based on five feature categories that affect FSOC signal propagation. The five feature categories physical factors correspond to the previously described five physical factors.

To model atmospheric losses in atmosphere, attenuation due to abruption and scattering is inversely proportional to the transmittance and is described by Beer's-Lambert law $$\tau(\lambda, R) = \frac{P_R}{P_T} \exp[-\gamma(\lambda)R],$$

where $\tau(\lambda, R)$ is the transmission coefficient as a function of wavelength $\lambda$ and range R and $\gamma(\lambda)$ is the attenuation coefficient, which is a function of wavelength $\lambda$. The attenuation coefficient is the sum of the absorption and scattering coefficients from aerosols and molecular constituents of the atmosphere and is given by $$\gamma(\lambda) = \underbrace{\alpha_m(\lambda)}_{Molecular\ absorb.coeff.} + \underbrace{\alpha_a(\lambda)}_{Aerosol\ absorb.coeff.} + \underbrace{\beta_m(\lambda)}_{Molecular\ scatt.coeff.} + \underbrace{\beta_a(\lambda)}_{Aerosol\ Scatt.coeff.}$$

The first two terms in the above equation represent the molecular and aerosol absorption coefficients, respectively while the last two terms are the molecular and aerosol scattering coefficients, respectively. Thus, a pure physics-based calculation of transmittance requires values for a molecular absorption coefficient, an aerosol absorption coefficient, a molecular scattering coefficient, and an aerosol scattering coefficient, all of which are wavelength dependent phenomena. These values also vary by altitude and composition of the atmosphere changes. Because of this, use of MODTRAN software to generate the FSOC data provides a more accurate picture than could be attained tying to implement the physics equations.

Figure 3:
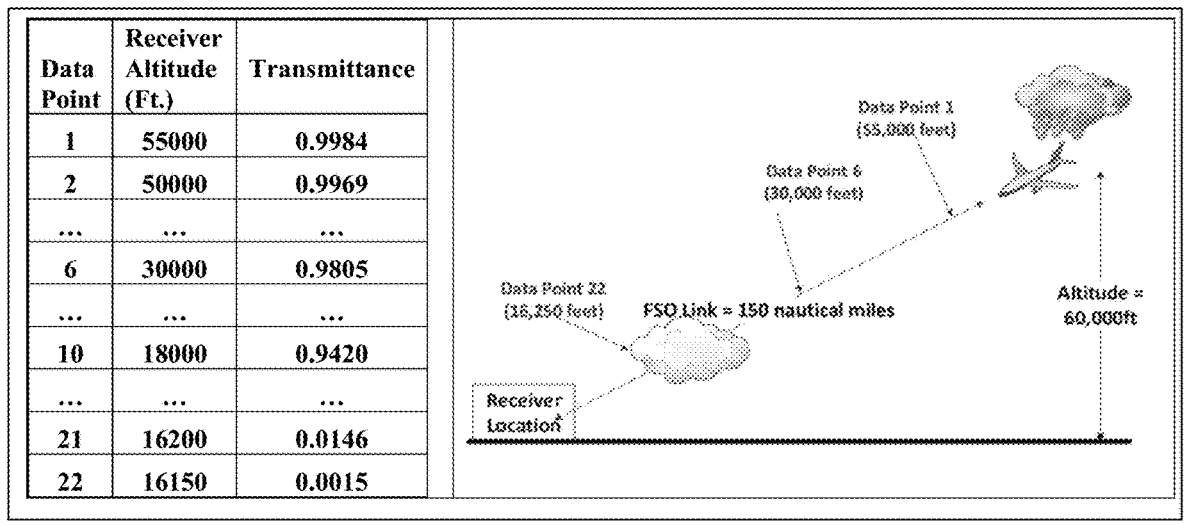
FIG. 3 depicts a schematic diagram illustrating an exemplary simulation configuration with rain and fog for collecting training datasets and testing datasets according to various disclosed embodiments of the present disclosure.

To train the prediction model, both air-to-air and air-to-ground links are simulated by MODTRAN with various simulation parameters including at least link distance, rain rate, and visibility. FIG. 3 depicts a schematic diagram illustrating an exemplary simulation configuration with rain and fog for collecting training datasets and testing datasets according to various disclosed embodiments of the present disclosure. The large number of data may be generated by MODTRAN with various simulation parameters for training and testing the prediction model.

Figure 4:
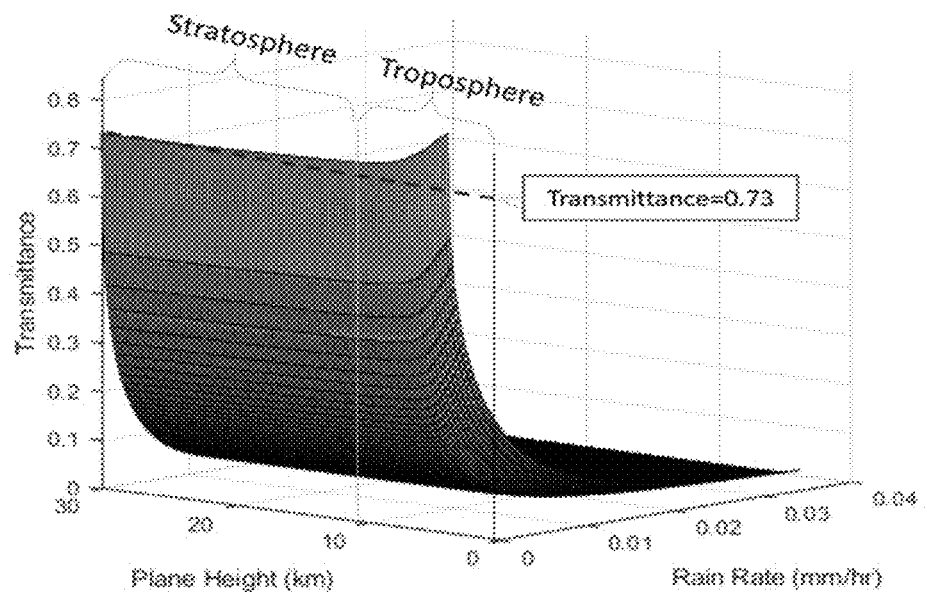
FIG. 4 depicts relationship between FSOC transmittance and airplane height and rain rate according to various disclosed embodiments of the present disclosure.

FIG. 4 depicts relationship between FSOC transmittance and airplane height and rain rate according to various disclosed embodiments of the present disclosure. As shown in FIG. 4, the FSOC transmittance is sensitive to the rain rate. For example, the FSOC transmittance drops from 0.85 to 0 when the rain rate changes from 0 mm/hr to 0.04 mm/hr and the airplane height is 5 km. The FSOC transmittance only varies in troposphere layer in response to changing rain rate. Rain is absent in stratosphere layer. Similarly, the visibility is only applicable in the troposphere layer. Above the troposphere layer, the visibility is set to a default value 340 km. The transmittance remains unchanged when the airplane height changes within the stratosphere layer but the visibility does not change.

Figure 5:
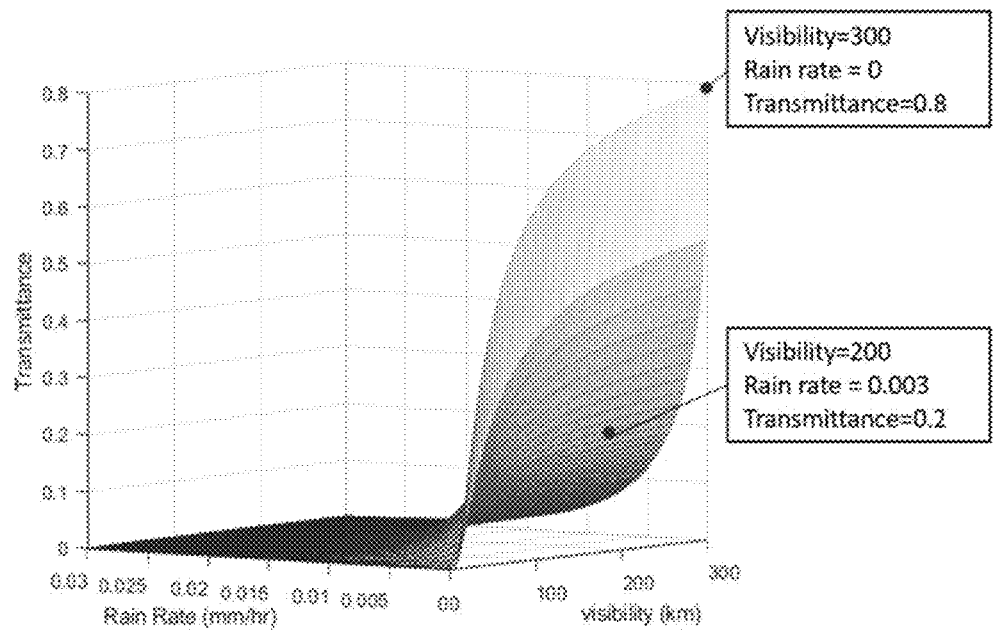
FIG. 5 depicts relationship between FSOC transmittance and airplane height and visibility according to various disclosed embodiments of the present disclosure.

FIG. 5 depicts relationship between FSOC transmittance and airplane height and visibility according to various disclosed embodiments of the present disclosure. As shown in FIG. 5, the FSOC transmittance drops to 0 until the visibility changes substantially from 300 km to 5 km. The visibility affects the FSOC transmittance less than the rain rate.

MODTRAN uses a statistical characterization of the distribution of line strengths in a spectral interval to compute spectral band transmittances, radiance, fluxes, etc. The transmittance absolute accuracy is generally better than ±0.005, thermal brightness temperature is generally accurate to better than 1K, and radiance accuracy is approximately ±2%. MODTRAN outputs a .txt file for each simulation that contains all output data from the simulation. This .txt file can be used as an input for training and testing the prediction model. The output data may include frequency information, wavelength, total transmittance, $H_2O$ transmittance, $CO_2$ transmittance, and etc.

Figure 6:
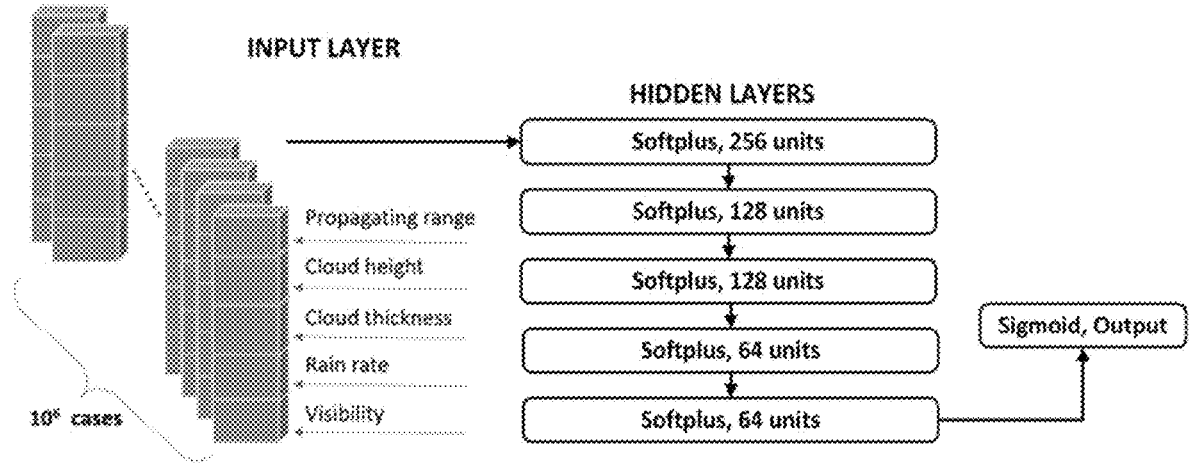
FIG. 6 depicts a schematic diagram illustrating an exemplary deep neural network (DNN) with five hidden layers according to various disclosed embodiments of the present disclosure.

FIG. 6 depicts a schematic diagram illustrating an exemplary DNN with five hidden layers according to various disclosed embodiments of the present disclosure. As shown in FIG. 6, the inputs of the DNN include five feature categories in one dimension. An input layer includes five neurons or five units, corresponding to five feature categories. The outputs of the input layer are the inputs of a first hidden layer. The first hidden layer includes inputs multiplied by weights plus biases. The outputs of the first hidden layer are the inputs of a second hidden layer. Similarly, the second hidden layer includes the inputs multiplied by weights plus biases. The outputs of the second hidden layer are the inputs of a third hidden layer. So on and so forth. The output layer is a one-unit layer. The output of the output layer is the output of the DNN. Then, a difference between the one-unit output y' of the DNN and the real value y is calculated. Based on the calculated difference, adjustments may be made to the weights and biases of each of the five hidden layers to minimize the difference between the predicted value y' and actual value y. The training procedure may be repeated with more training datasets until a desired performance of the prediction model is achieved.

During the training stage of the DNN-based prediction model, an activation function may be needed for each layer of the DNN. A softplus function, $f_1(x)=\ln(1+e^x)$, may be used as the activation function in each hidden layer of the DNN. A sigmoid function $f_2(x)=1/(1+e^{-x})$ is a derivation of the softplus function. The range of the sigmoid function is 0-1, which is exactly the same range of free space transmittance. Thus, the sigmoid function may be used in the output layer of the prediction model.

Returning to FIG. 2, at S230, a prediction error is evaluated by a loss function and weights and biases of the hidden layers of the DNN are adjusted to minimize the prediction error.

To evaluate the difference between the real value y and the predicted value y' from the prediction model, the loss function may be needed. The most popular loss functions include "mean squared error", "mean absolute error", "mean squared logarithmic error", and "squared hinge" functions. However, these loss functions are not as effective in this case.

Figure 8A:
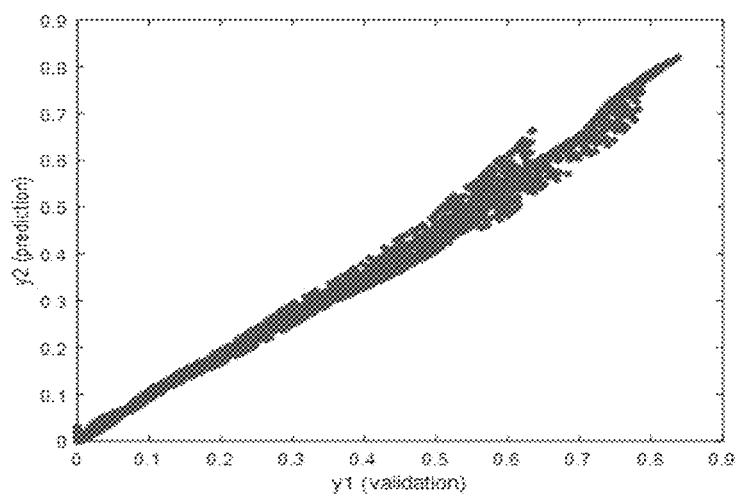
FIG. 8A depicts schematic diagrams illustrating fitting results by using mean square error loss function for model training evaluation according to various disclosed embodiments of the present disclosure.
Figure 8B:
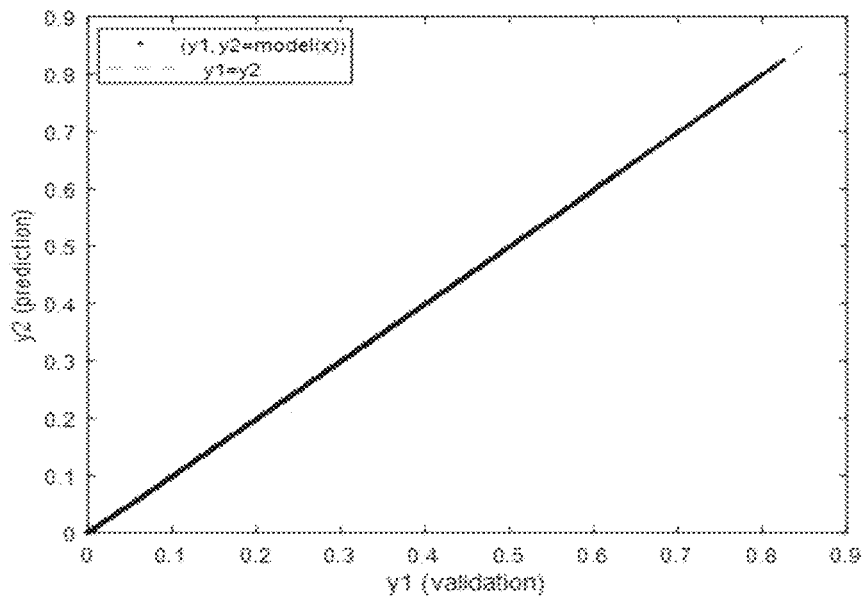
FIG. 8B depicts schematic diagrams illustrating fitting results by using Max_error loss function for model training evaluation according to various disclosed embodiments of the present disclosure.

In various embodiments, to improve the training efficiency, a loss function Max_error is defined as a combination of the maximum absolute error and the mean squared error, which can be expressed as $$\text{Max\_error} = p\left(\max_i\{|y'_i - y_i|\}\right) + (1-p)\left(\frac{1}{n}\sum_i (y'_i - y_i)\right),$$

where p in the Max_error is 0.5, and y' and y denote the predicted and actual transmittance, respectively. The loss function Max_error calculates the maximum error in each epoch. Only the large values of the transmittance (>0.1) are valid values that may be used to obtain a fitting model or to adjust the weights and biases in the hidden layers of the DNN. A large number of scenarios are generated to train the prediction model with random values of the parameters in the five feature categories. The training results using two different loss functions are compared in FIG. 8A and FIG. 8B. In FIG. 8A, the "mean square error" loss function is used to evaluate the training results, and the dataset has the tendency of linear relation but with large errors in some points. In FIG. 8B, Max_error loss function is used to evaluate the training results, and the dataset is a perfect line. Thus, the loss function Max_error is more reliable in fitting the prediction model.

Figure 7:
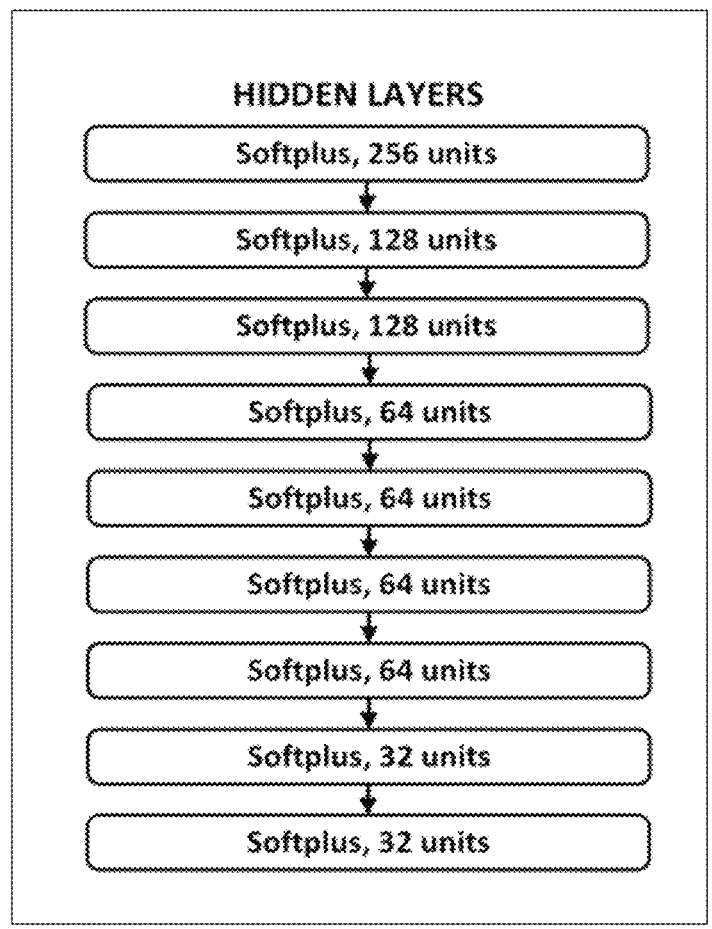
FIG. 7 depicts a schematic diagram illustrating nine hidden layers according to various disclosed embodiments of the present disclosure.
Figure 9:
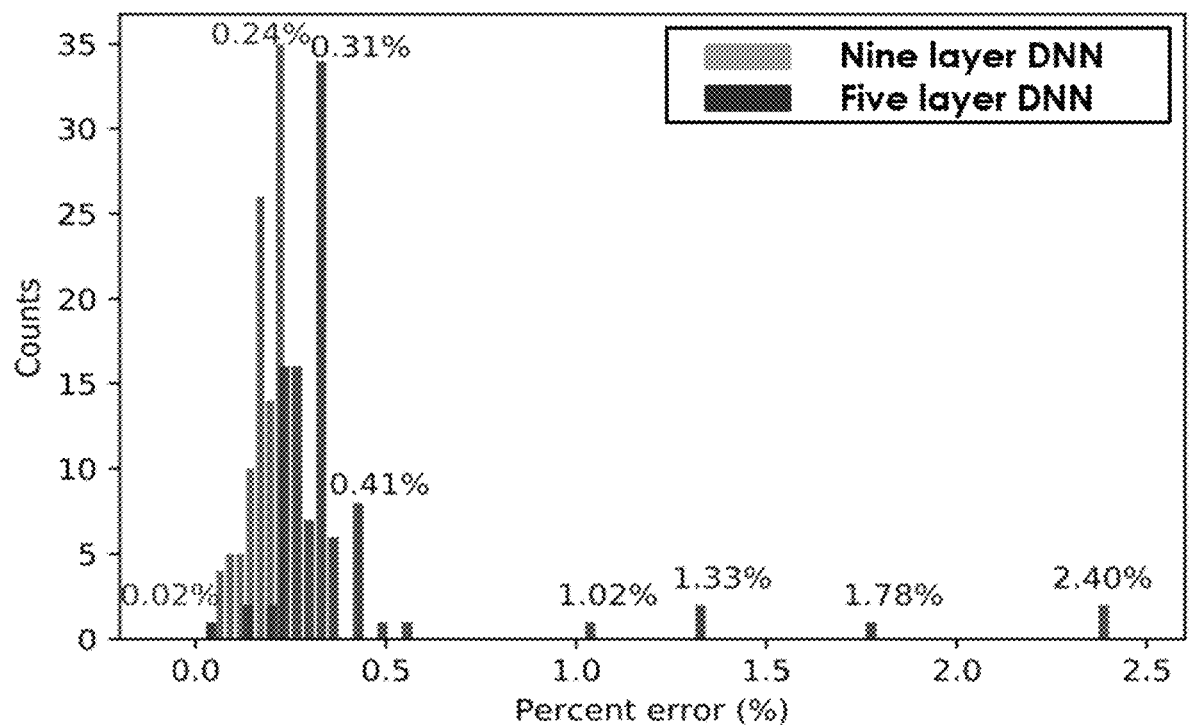
FIG. 9 depicts a schematic diagram illustrating prediction error performance of the prediction model based on DNNs with five hidden layers and nine hidden layers according to various disclosed embodiments of the present disclosure.

In various embodiments, different numbers of the hidden layers may be configured in the DNN. For example, a layout of nine hidden layers is shown in FIG. 7. The percent errors between the real transmittance and the transmittance predicted by the DNN-based prediction model with five hidden layers and nine hidden layers are calculated and compared in FIG. 9. In FIG. 9, counts refer to the percentage of total trials. For example, about 5% of prediction errors by the DNN with nine hidden layers is as low as 0.02%, and 35% of that is 0.24%. The range of the percent errors for the DNN-based prediction model with five hidden layers is approximately 0.02%-2.4%. The range of the percent errors for the DNN-based prediction model with nine hidden layers is squeezed to approximately 0.02%-0.24%, and the model error is reduced from 0.31% to 0.24%. The DNN-based prediction model with nine hidden layers is more accurate than the DNN-based prediction model with five hidden layers. On one hand, more hidden layers in the DNN result in more accurate prediction. On the other hand, when more hidden layers are configured in the DNN, it takes more iterations of training and testing to adjust more weights and biases in more hidden layers. The DNN with nine hidden layers strikes a reasonable balance between the accuracy of the prediction model and the time spent on model training.

At S240, training and testing the DNN-based prediction model is repeated until the prediction error is smaller than or equal to a pre-set threshold.

In various embodiments, training and testing the DNN-based prediction model by the training datasets and the testing datasets may be repeated with different scenarios to improve the accuracy of the performance prediction results. The prediction error of the DNN-based prediction model can be achieved as low as 0.2% between the simulated transmittance output by MODTRAN and the transmittance output predicted by the DNN-based prediction model.

In the application stage, at S250, parameters entered by a user are received for an application scenario. The user may enter parameters for the application scenario through a user interface. Correspondingly, the performance prediction for the application scenario is launched based on the parameters entered by the user.

At S260, real-time data are retrieved from the external data sources and prepared for the application scenario. The retrieved real-time data are inputted into the DNN-based prediction model by classifying and mapping the real-time data into the five feature categories. The classification prepares the real-time data to be inputted into the DNN-based prediction model that has been trained and optimized by the training datasets and the testing datasets simulated by MODTRAN.

At S270, near real-time FSOC performance prediction results are generated based on the trained prediction model. The classified and mapped real-time data are inputted into the DNN-based prediction model to generate the performance prediction results in near real-time. The performance prediction results may include the predicted transmittance of the free space between the optical transmitter and the optical receiver of the FSOC system.

Since the inputted data are real-time data, the performance prediction results may be outputted in near real-time. In various embodiments, the time between the moment that the user launches a performance prediction task through the user interface and the moment the performance prediction result is displayed on the user interface is less than approximately 2 seconds. In one example, the near real-time performance prediction results may be used to guide the airborne airplane to avoid flying into air space that may cause undesired FSOC performance degradation. In another example, as the airborne airplane flies in an air space, an icon of the airplane moves correspondingly on the user interface. As the icon of the airplane moves on the user interface, the performance prediction result may be updated in near real-time and displayed accordingly on the user interface.

Figure 10:
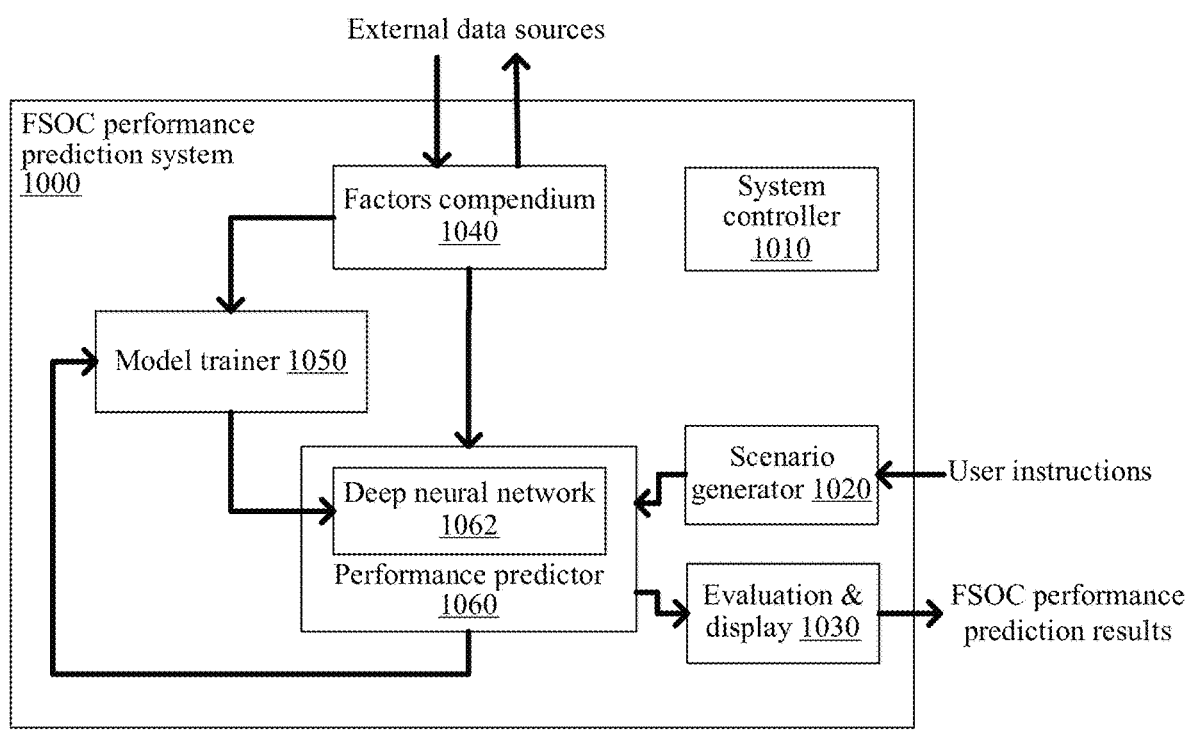
FIG. 10 depicts a block diagram illustrating an exemplary FSOC performance prediction system according to various disclosed embodiments of the present disclosure.

Various embodiments also provide a toolchain system for FSOC performance prediction. FIG. 10 depicts a block diagram illustrating an exemplary toolchain system 1000 for FSOC performance prediction according to various disclosed embodiments of the present disclosure. As shown in FIG. 10, the toolchain system 1000 for FSOC performance prediction includes a system controller 1010, a scenario generator 1020, an evaluation and display 1030, factors compendium 1040, a model trainer 1050, and a performance predictor 1060. The performance predictor includes a deep neural network 1062.

In various embodiments, the structure of the toolchain system 1000 for FSOC performance prediction may be based on service-oriented architecture (SOA). The SOA architecture ties together a diverse collection of resources and tools to form the toolchain system 1000 for FSOC performance prediction that provides a near real-time FSOC performance prediction service to a user. The operation of the toolchain system 1000 for FSOC performance prediction includes a training stage and an application stage. The toolchain system 1000 for FSOC performance prediction may be implemented by performing the FSOC performance prediction method on a computer system or a computer cluster.

Figure 11:
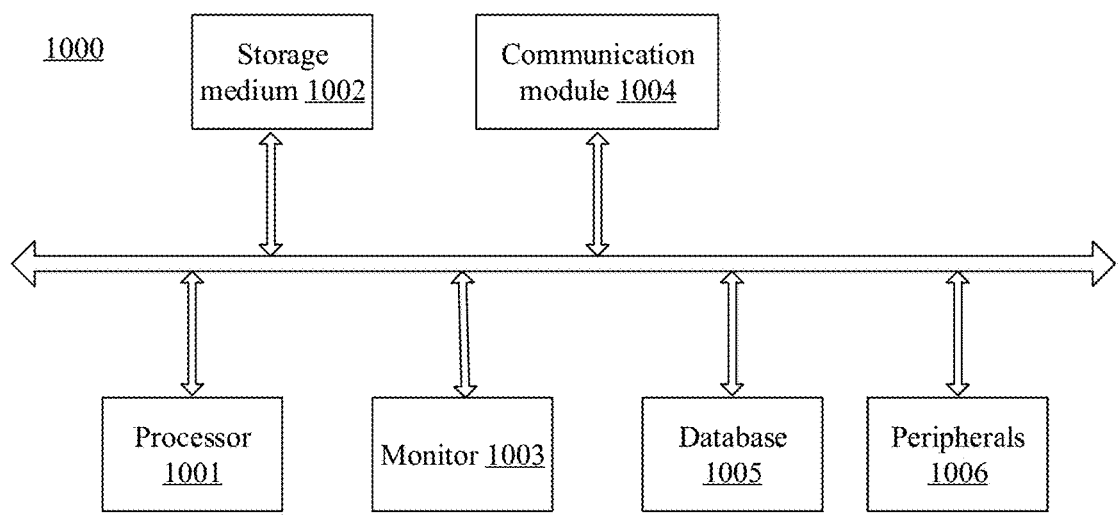
FIG. 11 depicts a block diagram illustrating an exemplary FSOC performance prediction system according to various disclosed embodiments of the present disclosure.

FIG. 11 depicts a block diagram illustrating another exemplary toolchain system 1000 for FSOC performance prediction according to various disclosed embodiments of the present disclosure. As shown in FIG. 11, the toolchain system 1000 for FSOC performance prediction may include a processor 1001, storage medium 1002, a monitor 1003, a communication module 1004, a database 1005, and peripherals 1006. Certain devices may be omitted and other devices may be included.

The processor 1001 may include any appropriate processor or processors. Further, the processor 1001 can include multiple cores for multi-thread or parallel processing. The storage medium 1002 may include memory modules, such as Read-only Memory (ROM), Random Access Memory (RAM), flash memory modules, erasable and rewritable memory, and mass storages, such as CD-ROM, U-disk, and hard disk, etc. The storage medium 1002 may store computer programs for implementing various processes, when executed by the processor 1001.

Further, the peripherals 1006 may include I/O devices such as a keyboard and a mouse. The communication module 1004 may include network devices for establishing connections through the communication network. The database 1005 may include one or more databases for storing certain data and for performing certain operations on the stored data, such as database searching.

In various embodiments, the toolchain system 1000 for FSOC performance prediction integrates various simulation software tools to provide FSOC performance prediction results based on metrics such as visibility, rain rate, airplane (optical transmitter) height, observer (optical receiver) height, propagating range, and transmittance of FSOC channel. Real-time data from external data sources such as terrain data from Cesium, weather data from Open Weather, and optical beam parameters are retrieved and inputted into the toolchain system 1000 for FSOC performance prediction. On the other hand, the toolchain system 1000 for FSOC performance prediction allows the user to enter operating parameters, such as number of factors, condition events, and configurations, to define scenarios and missions for the performance prediction. The operating parameters capture a minimum set of information in order to accurately and real-timely validate the analysis of weather, terrain, and other conditions to achieve desired performance for FSOC-equipped communications.

The toolchain system 1000 for FSOC performance prediction takes a software-in-the-loop approach to integrate and build a distributed multi-simulation toolchain. Returning to FIG. 10, the scenario generator 1020 includes a simulation tool Cesium. Cesium is a geospatial three-dimensional (3D) mapping platform with real-time dynamic terrain information for creating virtual globes by transforming massive and diverse geospatial data into streaming 3D content to be used in any application and any environment. Based on user's instructions, the scenario generator 1020 simulates scenarios or missions from subsurface to space and across multiple levels of model fidelity. FSOC performance prediction operational requests entered by the user are parsed and eventually processed by the performance predictor 1060 which runs Hadoop & Spark framework for big data premium processing. The performance predictor 1060 may include performance prediction models and transmission approaches of FSOC planning, with disruptive factors of FSOC laser beam. The computing tasks of the performance prediction will be implemented on a high performance computer (HPC). The results are shown by the evaluation & display 1030 via visualization data logs and graphical charts with Kafka streaming to guarantee near real-time performance. The evaluation & display 1030 may also include a 3D visualization graphical user interface (GUI) developed to interact with the various factors and sources. The graphical user interface and the interaction are developed on java-based web servers (Spring Boot).

On the other hand, the factors compendium 1040 takes all the physical FSOC factors (e.g., weather model, atmospheric conditions, laser beam angles, other environment effect and etc.) into consideration to retrieve real-time data from external sources. The factors compendium 1040 may include a MODTRAN model, for example, PcModWin, a commercial Windows version of the United States Air Force Research Laboratory's MODTRAN model. The real-time data retrieved from the external sources are processed by the factors compendium 1040 to be fed into a DNN-based prediction model 1062 contained in the performance predictor 1060. The performance predictor 1060 applies the machine learning technique to provide full assessment on required models with the consideration of the sophisticated real-time weather environments of Up-/Down-Link Availability and Uplink/Downlink System Availability.

As shown in FIG. 10, in the training stage, the performance prediction results generated by the performance predictor 1060 and the performance results simulated by MODTRAN are inputted into the model trainer 1050. The model trainer 1050 uses the loss function Max_error to calculate the prediction error. Based on the calculated prediction error, the model trainer 1050 adjusts the weights and biases of hidden layers of the DNN 1062.

In the application stage, the performance predictor 1060 takes input data from the factors compendium 1040 and the scenario generator 1020 to run the machine learning technique on the computer cluster to generate the performance prediction results to be displayed by the evaluation and display 1030.

The computing tasks run on the computer cluster and the high performance computers for implementing the FSOC performance prediction method are coordinated by the system controller 1010.

Figure 12:
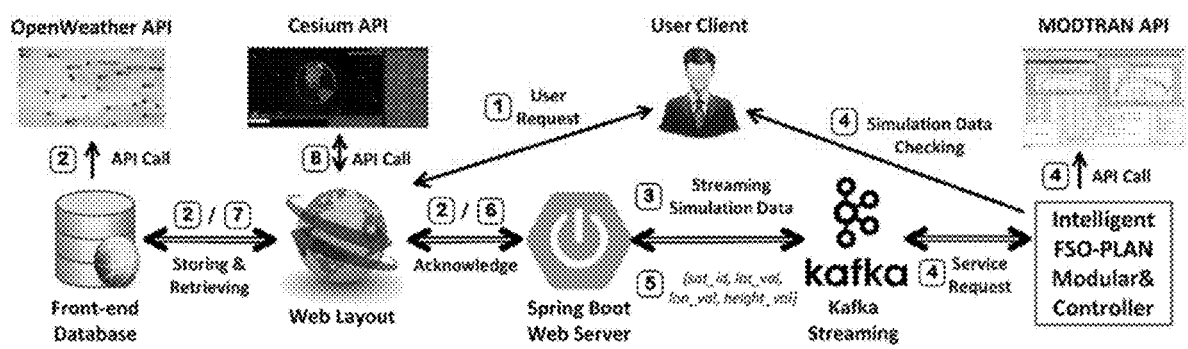
FIG. 12 depicts a schematic diagram illustrating an exemplary software-in-the-loop implementation framework according to various disclosed embodiments of the present disclosure.

The front-end web interface of the scenario generator 1020 cannot conduct real-time communication with MODTRAN and its database directly due to system complexity. Hence, a comprehensive implementation workflow of toolchain is designed for the communications among multiple functional blocks of the toolchain system 1000 for FSOC performance prediction. The working framework is shown in FIG. 12. The details of the implementation of this toolchain framework is described below.

The toolchain framework consists of 8 steps in the working procedures of toolchain communications. At Step 1, initially, the user may login the web layout and submit the user request (such as FSO coverage prediction, request performance model retrieval and FSOC evaluation). Then the front-end web may synchronize the weather information from the external data source via OpenWeather API, and also acknowledge its Spring Boot server for the task request at Step 2. At Step 3, the user request message is delivered via Message Passing service to Kafka server, which is a third-party platform providing online data streaming and message transferring. The request message may include all the required physics-based FSOC model parameters and platform information, including geometric and aerosol settings, propagating through cloud or not and the propagating length through cloud.

At Step 4, Kafka server passes the request message to an FSO-PLAN controller for computational service request. The FSO-PLAN controller is deployed and executed on an HPC for achieving real-time high-performance calculation of FSOC performance prediction. At this point, the computational service request may be called to check the running status of a streaming server streaming data from MODTRAN. When a previous computational service request is executing, the newly submitted computational service request may be assigned for pending. When the streaming server is idle, the newly submitted request may be automatically activated for running. To this end, the FSO-PLAN controller may synchronize and process MODTRAN emulation and training results via API calls, and send back the training results to a front-end web server. Meanwhile, the user may check the status of simulation data generation in the FSO-PLAN controller because a simplified interface is provided for display data tables from MODTRAN for reference.

At Step 5, when dynamic simulation data streaming continues, Kafka server may be enabled again to pass all the generated performance prediction results of FSOC transmittance (such as platform id, coverage range, estimated values of latitude, longitude and height) to a front-end web Spring Boot server. Then at Step 6, the Spring Boot server may provide feedback to web layout for the data streaming. After that, at Step 7, all the performance prediction results received from Hyper Text Transfer Protocol (HTTP) call may be stored or retrieved via a front-end database. Finally, at Step 8, a leading 3D globe and map for static and time-dynamic content is displayed via Cesium API with the best possible performance, precision and visual quality for FSO coverage prediction evaluation.

Figure 13:
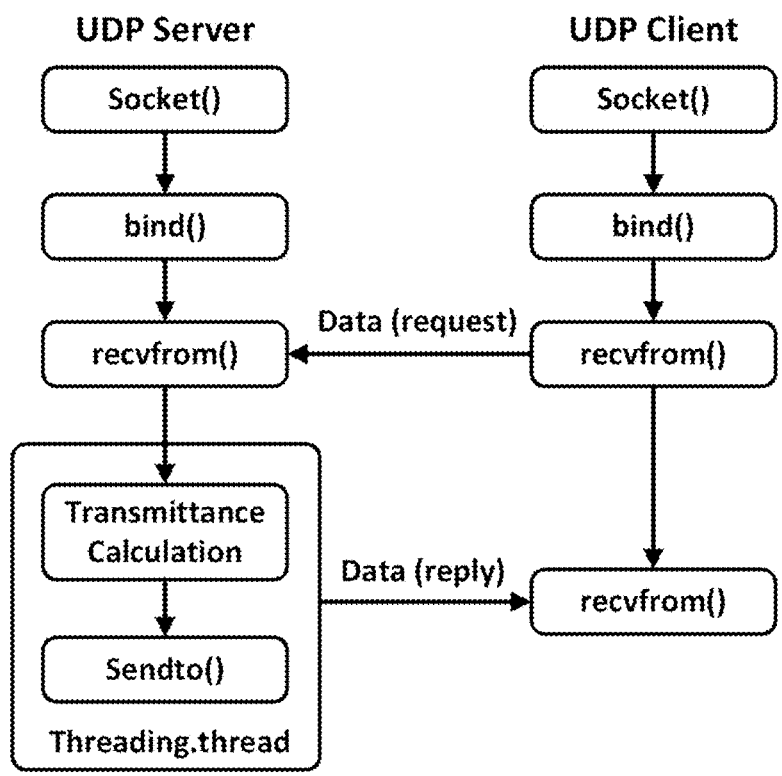
FIG. 13 depicts a flowchart diagram illustrating an exemplary user datagram protocol (UDP) server-client interaction according to various disclosed embodiments of the present disclosure.

In various embodiments, server-client connections are based on User Datagram Protocol (UDP). As a simple transport-layer protocol, UDP is preferred for exchanging message swiftly. UDP is sufficiently reliable for managing the computing tasks involved in the near real-time FSOC performance prediction (aerosol settings and transmittance). FIG. 13 depicts a flowchart diagram illustrating an exemplary UDP server-client interaction according to various disclosed embodiments of the present disclosure.

Assuming that the server and the client are on the same local area network and are binding together via a deploying port. When the aerosol settings are created and sent to the server, the server may receive both the aerosol settings and an address from the client. A thread may be created to make sure that multiple computing tasks run simultaneously since the server keeps listening messages from the client. In each computing task processing, the aerosol settings and the client address may be sent to the thread and transmittance may be calculated in the thread. The performance prediction result may be sent back to the client after properly formatted and encoded into bytes. Finally, the transmittance may be decoded to json format and rendered and displayed on the GUI.

In various embodiments, the software programming aspect of implementing the FSOC performance prediction method at the back-end is described below. Parameters (geometric and aerosol settings, propagating through cloud or not and the propagating length through cloud) inputted from the front-end web interface are transferred from byte format to a list by a function "byte2list". Then, the performance prediction model that has been trained is loaded and a predicted transmittance value is calculated based on the inputted parameters in the list format. A function "without cloud" is used to calculate the transmittance value without cloud based on the predicted transmittance value considering an attenuation loss. When the laser beam passes through a given length of cloud, the attenuation loss is updated by multiplying a cloud attenuation rate. Then the transmittance value is estimated based on the updated attenuation loss. Simultaneously, the functions "write_input" and "read_result" are used to write the input file and read output file of MODTRAN. After that, the transmittance value calculated based on the performance prediction model and the transmittance value generated from MODTRAN are converted into a format for being displayed by a function "display". Finally, the two transmittance values are encoded and sent back to the front-end.

In various embodiments, the software programming aspect of implementing the FSOC performance prediction method at the front-end is described below. To present the most useful data and obtain prescriptive and meaningful information for practical use, a user-friendly FSOC performance analysis user interface is provided. The user interface is based on an implementation platform named Spring Boot. Spring Boot is a java-based integrated development environment. Spring Boot enables developers to get started with coding immediately with pre-setup workspaces, collaborate with their peers with collaborative coding features, and include web development features like live preview and browser compatibility testing. Furthermore, to support the development of FSOC performance prediction and adaptive transmission, a graphical visualization with data logs is provided for both air-to-air, air-to-ground, and space-to-ground scenarios.

Since a near real-time data streaming and analyzing is performed among multiple tools, the toolchain system 1000 for FSOC performance prediction requires low latency and high-quality data interaction between the front-end and the back-end. A brief dataflow of Kafka streaming procedure for the data interaction between the front-end and the back-end is described below. The original scenario data is first generated from Cesium (terrain data) and Open Weather (weather data) and imported to the FSO-PLAN controller. The scenario data are then loaded into a front-end database. Next, a storage table is created for each FSOC scenario and its related weather information. After that, Spring Boot framework is used to set up database connection for near real-time data acquisition. The scenario data are extracted from the front-end database and are passed to Spring objects and to the views. Then, the Spring objects are converted into Json arrays. Finally, the Json arrays are converted into JavaScript arrays, which can be directly used for the GUI display. Different selection of FSOC ID, observer (optical receiver) location, and related weather information may be pulled into front-end function calls to enable Cesium API for rendering and displaying.

Figure 14A:
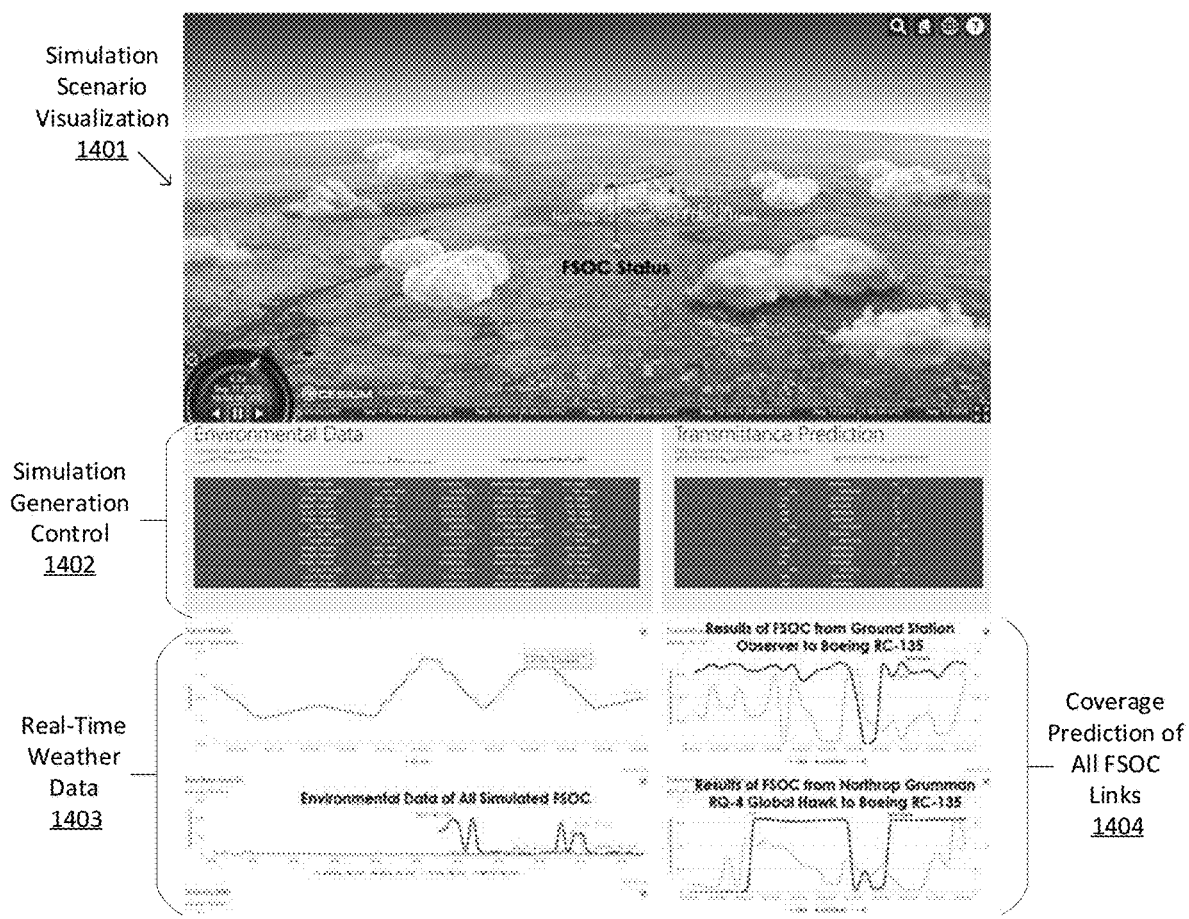
FIG. 14A-14D depict schematic diagrams illustrating an exemplary front-end visualization layout of FSOC performance prediction results according to various disclosed embodiments of the present disclosure.

After the user enters configuration of the FSOC scenario, a Spring Boot-based web framework with Cesium API and Open Weather API plugins is deployed and implemented on the front-end user interface. FIG. 14A depicts a schematic diagram illustrating an exemplary front-end visualization layout of FSOC performance prediction results according to various disclosed embodiments of the present disclosure. As shown in FIG. 14A, the front-end visualization layout of both air-to-air and air-to-ground FSOC performance prediction result visualization with FSOC link status and weather situation are included in a simulation scenario visualization section 1401.

Figure 14B:
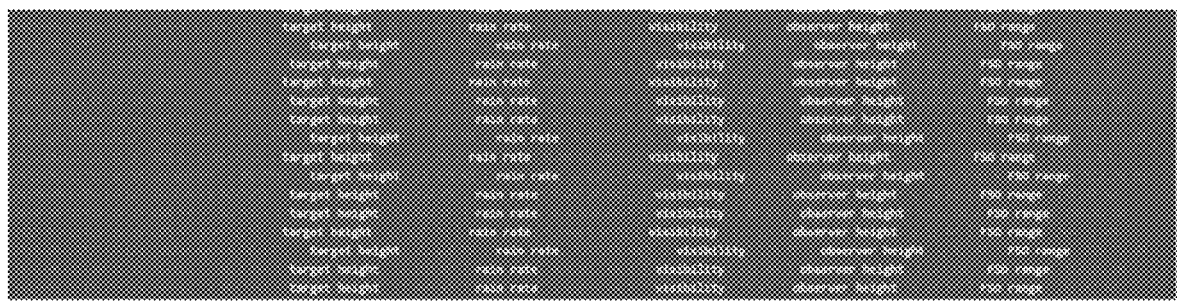
Figure 14C:
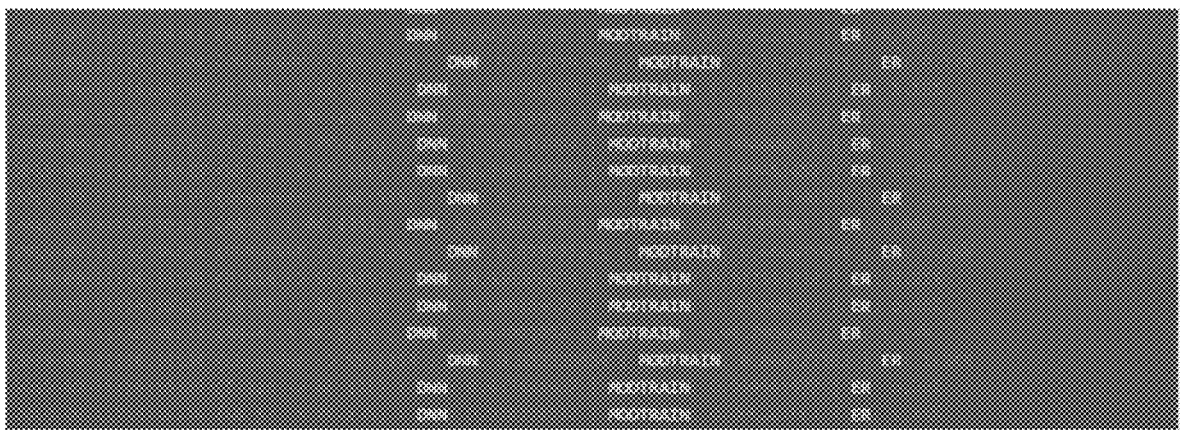

In a scenario generation control section 1402, the left-side log window shows the simulation scenario generation control, including all the simulated environmental data such as target (optical transmitter) height, rain rate, visibility, observer (optical receiver) height and FSOC propagating range. FIG. 14B shows an enlarged view of the left-side log window. Further, the right-side log window reveals the real-time transmittance prediction results of FSOC applications. Any abnormal results with low FSOC power intensity may be flagged in red. FIG. 14C shows an enlarged view of the right-side log window.

Figure 14D:
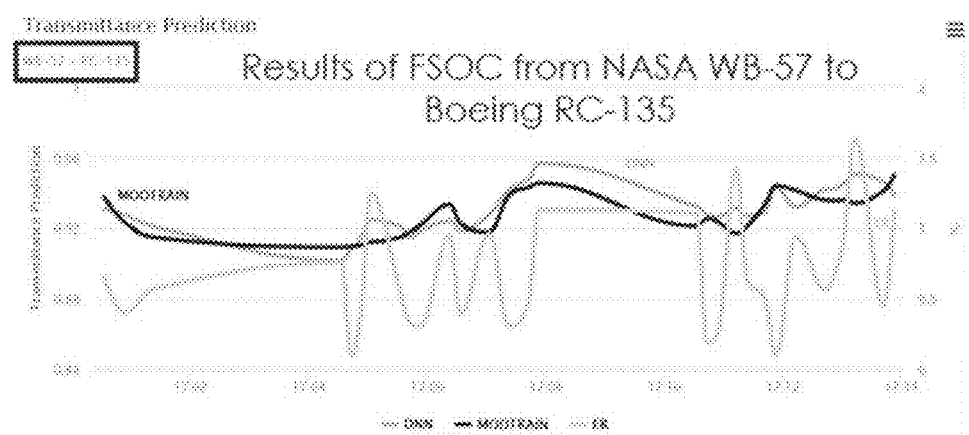

In a real-time weather data section 1403, environmental data of all simulated FSOC scenarios are displayed in real-time. In a coverage prediction section 1404, coverage prediction of all FSOC links are displayed in near real-time. For example, FIG. 14D shows an enlarged view of the coverage prediction of the FSOC link from NASA W57 to Boeing RC-135.

In the embodiments of the present disclosure, the toolchain system 1000 for FSOC performance prediction provides a multi-simulation toolchain-based platform with visualization view of various practical application scenarios (e.g., air-to-air, air-to-ground) for FSOC performance prediction. The front-end user interface is an original 3D display environment and provides a clear web layout with multi-functions, such as zoom in/out, rotation, search destination and so on.

In the embodiments of the present disclosure, the ML approach is incorporated in the FSOC performance prediction method. The physical factors extracted from the physics-based FSOC performance prediction models are used as a starting point for ML-based performance prediction modeling. Then, a large number of training data are collected through simulation by MODTRAN according to the physical factors identified by physics-based model analysis. An effective and efficient DNN was designed and implemented using the training data. The prediction error of the ML-based FSOC performance predictor is as low as 0.2% between the MODTRAN output and ML-based predictor output.

In addition, the FSOC performance prediction system integrates various simulation software tools to form a toolchain-based software-in-the loop platform. The ML-based performance prediction system is dynamically adapted to the operating status (e.g., numbers of factors, condition events, and configurations), which captures a minimum set of information including key parameters/metrics such as visibility, rain rate, plane (optical transmitter) height, observer (optical receiver) height, propagating range and transmittance of FSOC channel to accurately and real-timely achieve best performance prediction for FSOC-equipped communication systems.

While the disclosure has been illustrated with respect to one or more implementations, alterations and/or modifications can be made to the illustrated examples without departing from the spirit and scope of the appended claims. In addition, while a particular feature of the disclosure may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A free space optical communication (FSOC) performance prediction method, comprising:
   in a training stage, collecting a large number of data representing FSOC performance from external data sources and through simulation in five feature categories;
   dividing the collected data into training datasets and testing datasets to train a prediction model based on a deep neural network (DNN);
   evaluating a prediction error by a loss function and adjusting weights and biases of hidden layers of the DNN to minimize the prediction error;
   repeating training the prediction model until the prediction error is smaller than or equal to a pre-set threshold;
   in an application stage, receiving parameters entered by a user for an application scenario;
   retrieving and preparing real-time data from the external data sources for the application scenario; and
   generating near real-time FSOC performance prediction results based on the trained prediction model.

2. The method according to claim 1, wherein:
   the five feature categories include propagation range, rain rate, visibility, cloud height, and cloud thickness.

3. The method according to claim 1, wherein:
   the DNN includes one input layer, a plurality of hidden layers, and one output layer;
   the input layer includes five neurons or units; and
   the output layer includes one neuron or unit.

4. The method according to claim 3, wherein:
   the plurality of hidden layers include five hidden layers;
   a first hidden layer includes 128 neurons;
   a second hidden layer includes 64 neurons;
   a third hidden layer includes 64 neurons;
   a fourth hidden layer includes 32 neurons; and
   a fifth hidden layer includes 32 neurons.

5. The method according to claim 3, wherein:
   the plurality of hidden layers include nine hidden layers;
   a first hidden layer includes 256 neurons;
   a second hidden layer includes 128 neurons;
   a third hidden layer includes 128 neurons;
   a fourth hidden layer includes 64 neurons;
   a fifth hidden layer includes 64 neurons;
   a sixth hidden layer includes 64 neurons;
   a seventh hidden layer includes 64 neurons;
   an eighth hidden layer includes 32 neurons; and
   a ninth hidden layer includes 32 neurons.

6. The method according to claim 3, wherein:
   a softplus activation function $\ln(1+e^x)$ is used in each hidden layer; and
   a sigmoid function $1/(1+e^{-x})$ is used in the output layer.

7. The method according to claim 1, wherein:
   the pre-set threshold is approximately 0.2%.

8. The method according to claim 1, wherein:
the external data sources include terrain data from Cesium and weather data from Open Weather.

9. The method according to claim 1, wherein:
collecting the FSOC performance data through simulation includes using a computer program called MODerate resolution atmospheric TRANsmission (MODTRAN) to simulate the FSOC to obtain the FSOC performance data.

10. The method according to claim 1, wherein:
the loss function $$\text{Max\_error} = p\left(\max_i \{|y'_i - y_i|\}\right) + (1-p)\left(\frac{1}{n}\sum_i (y'_i - y_i)\right),$$

where p is 0.5, and y' and y denote the predicted and actual transmittance.

11. The method according to claim 1, wherein:
the performance prediction result is generated and display on a user interface within approximately 2 seconds after the user launches a performance prediction task for an application scenario through the user interface.

12. A toolchain system for FSOC performance prediction, comprising:
a memory storing computer program instructions; and
a processor coupled to the memory and, when executing the computer program instructions, configured to perform:
in a training stage, collecting a large number of data representing FSOC performance from external data sources and through simulation in five feature categories;
dividing the collected data into training datasets and testing datasets to train a prediction model based on a deep neural network (DNN);
evaluating a prediction error by a loss function and adjusting weights and biases of hidden layers of the DNN to minimize the prediction error;
repeating training the prediction model until the prediction error is smaller than or equal to a pre-set threshold;
in an application stage, receiving parameters entered by a user for an application scenario;
retrieving and preparing real-time data from the external data sources for the application scenario; and
generating near real-time FSOC performance prediction results based on the trained prediction model.

13. The toolchain system according to claim 12, wherein:
the computer program instructions include a service-oriented architecture to seamlessly integrate software tools distributed across Internet and are structured as a toolchain-based software-in-the-loop platform to capture real-time environmental data and to use data streaming implementation to continuously generate near real-time FSOC performance prediction results.

14. The toolchain system according to claim 12, wherein:
the five feature categories include propagation range, rain rate, visibility, cloud height, and cloud thickness.

15. The toolchain system according to claim 12, wherein:
the DNN includes one input layer, a plurality of hidden layers, and one output layer;
the input layer includes five neurons or units; and
the output layer includes one neuron or unit.

16. The toolchain system according to claim 15, wherein:
the plurality of hidden layers include five hidden layers;
a first hidden layer includes 128 neurons;
a second hidden layer includes 64 neurons;
a third hidden layer includes 64 neurons;
a fourth hidden layer includes 32 neurons; and
a fifth hidden layer includes 32 neurons.

17. The toolchain system according to claim 15, wherein:
the plurality of hidden layers include nine hidden layers;
a first hidden layer includes 256 neurons;
a second hidden layer includes 128 neurons;
a third hidden layer includes 128 neurons;
a fourth hidden layer includes 64 neurons;
a fifth hidden layer includes 64 neurons;
a sixth hidden layer includes 64 neurons;
a seventh hidden layer includes 64 neurons;
an eighth hidden layer includes 32 neurons; and
a ninth hidden layer includes 32 neurons.

18. The toolchain system according to claim 15, wherein:
a softplus activation function $\ln(1+e^x)$ is used in each hidden layer; and
a sigmoid function $1/(1+e^{-x})$ is used in the output layer.

19. The toolchain system according to claim 12, wherein:
the pre-set threshold is approximately 0.2%.

* * * * *